US008656301B2

(12) United States Patent
Nordtvedt et al.

(10) Patent No.: US 8,656,301 B2
(45) Date of Patent: Feb. 18, 2014

(54) INFORMATION DISPLAY SYSTEM

(75) Inventors: Jan-Erik Nordtvedt, Bergen (NO); Jørgen Hosøy, Bergen (NO)

(73) Assignee: Epsis AS, Bergen (NO)

( * ) Notice: Subject to any disclaimer, the term of this patent is extended or adjusted under 35 U.S.C. 154(b) by 632 days.

(21) Appl. No.: 12/387,431

(22) Filed: Apr. 30, 2009

(65) Prior Publication Data

US 2010/0281419 A1    Nov. 4, 2010

(51) Int. Cl.
*G06F 3/0481* (2013.01)

(52) U.S. Cl.
USPC .......... 715/781; 715/804; 715/273; 376/215; 376/216

(58) Field of Classification Search
USPC ........................................................ 715/781
See application file for complete search history.

(56) References Cited

U.S. PATENT DOCUMENTS

| Patent No. | | Date | Inventor | Page |
|---|---|---|---|---|
| 4,552,718 A | * | 11/1985 | Impink et al. | 376/216 |
| 4,632,802 A | * | 12/1986 | Herbst et al. | 376/216 |
| 4,803,039 A | * | 2/1989 | Impink et al. | 376/216 |
| 4,815,014 A | * | 3/1989 | Lipner et al. | 702/184 |
| 4,816,208 A | * | 3/1989 | Woods et al. | 376/259 |
| 4,957,690 A | * | 9/1990 | Fennern | 376/216 |
| 5,068,080 A | * | 11/1991 | Impink et al. | 376/215 |
| 5,089,978 A | * | 2/1992 | Lipner et al. | 702/183 |
| 5,227,121 A | * | 7/1993 | Scarola et al. | 376/216 |
| 5,253,186 A | * | 10/1993 | Lipner et al. | 702/182 |
| 5,351,200 A | * | 9/1994 | Impink, Jr. | 702/181 |
| 5,353,315 A | * | 10/1994 | Scarola et al. | 376/259 |
| 5,361,198 A | * | 11/1994 | Harmon et al. | 700/83 |
| 5,859,885 A | * | 1/1999 | Rusnica et al. | 376/259 |
| 5,864,782 A | * | 1/1999 | Mederer et al. | 702/182 |
| 6,058,334 A | * | 5/2000 | Shapiro | 700/97 |
| 6,989,739 B2 | * | 1/2006 | Li | 340/438 |
| 7,444,320 B1 | * | 10/2008 | Bakke et al. | 1/1 |
| 7,519,503 B2 | * | 4/2009 | Midttun et al. | 702/179 |
| 7,953,503 B2 | * | 5/2011 | Thurau | 700/80 |
| 2002/0054141 A1 | * | 5/2002 | Yen et al. | 345/804 |

(Continued)

FOREIGN PATENT DOCUMENTS

| WO | WO 99/39276 | 8/1999 |
|---|---|---|
| WO | 02/01482 | 1/2002 |
| WO | WO 2008/100148 A2 | 8/2008 |

OTHER PUBLICATIONS

Romero et al., "SIP Application to Multimedia Telecontrol of Power Systems", World Automation Congress, Spain, *IEEE*, 2004, vol. 18, 28, pp. 87-92.

(Continued)

*Primary Examiner* — William Bashore
*Assistant Examiner* — Reza Nabi
(74) *Attorney, Agent, or Firm* — Abelman, Frayne & Schwab

(57) ABSTRACT

An information display system (10) comprises computing hardware (30) coupled to a graphical screen interface. (50) The system (10) further includes one or more interface modules (70) including local data processing thereat for receiving input data streams ($S_1$ to $S_N$). Moreover, the computing hardware (30) is operable to execute one or more software products for generating a software environment presented in operation on the graphical screen interface (50). Furthermore, the computing hardware (30) is operable when executing the one or more software products to present a representation of one or more of the input data streams ($S_1$ to $S_N$) in one or more graphical windows (100, 110, 120A to 120F) within the software environment as provided on the graphical screen interface (50).

18 Claims, 4 Drawing Sheets

(56) References Cited

U.S. PATENT DOCUMENTS

| | | | |
|---|---|---|---|
| 2005/0071754 A1* | 3/2005 | Morgan et al. | 715/511 |
| 2008/0201706 A1* | 8/2008 | Nordtvedt et al. | 717/177 |
| 2009/0113490 A1* | 4/2009 | Wasden et al. | 725/67 |
| 2010/0064374 A1* | 3/2010 | Martin et al. | 726/27 |
| 2010/0281419 A1* | 11/2010 | Nordtvedt et al. | 715/781 |

OTHER PUBLICATIONS

Barriuso Poy et al., "The detector control system of the ATLAS experiment", *IOP Publishing Ltd. & SISSA*, May 27, 2008, vol. 3, No. 5, Abstract & pp. 1-42.

Moller, R., "Advanced Human—Computer Interaction Methods for the Control of Technical Systems", Proceedings of Fifth IEEE Caracas Conf. on Devices, Circuits and Systems, Dominican Republic, *IEEE*, vol. 1, Nov. 2004, pp. 130-135.

Kovacs et al., "Some Interactive Multimedia Applications in Production Engineering", IEEE $3^{rd}$ International Conference, Mauritius, *IEEE*, 2005, pp. 161-167.

Escudero et al., "IDOLO: Multimedia Data Deployment on SCADA Systems", Power Systems Conference & Exposition, New York City, *IEEE*, 2004, pp. 622-627.

\* cited by examiner

INFORMATION DISPLAY SYSTEM

FIELD OF THE INVENTION

The present invention relates to information display systems utilizing graphical screens. Moreover, the invention concerns methods of employing these information display systems. Furthermore, the invention relates to software products recorded on machine-readable data storage media, the software being executable upon computing hardware for implementing methods pursuant to the present invention.

BACKGROUND OF THE INVENTION

It is known from a published international PCT patent application PCTNO08/000046 (WO 2008/100148) (Epsis AS) that problems arise with human information overload when handling multiple parallel processes involving numerous sources of information in combination with multiple recipients of information; this international PCT patent application is hereby incorporated by reference as support for the present invention. Such information overload is for example experienced in a control centre for a complex oil production facility, wherein numerous complex concurrent processes are executed in the production facility. It is essential that the processes can be controlled from within a software environment where inputs and data relevant to the concurrent processes can be quickly accessed and viewed, for example for executing decisions. For example, when an accident or similar detrimental event occurs within the production facility, for example a blow out or a fire, it is essential that remedial action can be executed rapidly, the remedial action being implemented by invoking a process within the software environment which allows access to parties and data relevant to the invoked process. The processes are defined beforehand (a priori) together with their associated inputs and relevant sources of data, for example databases, operating schedules and so forth. The inputs are, for example, a telephone or video connection to staff distributed within the facility, to technical experts remote from the facility. However, the control centre is to be regarded as a substantial investment with its numerous screens and associated computing hardware. Software products for implementing such a control centre are provided by Epsis AS by way of its ERA Connect family of products.

A problem encountered is that there arise many alternative situations in the World where a control centre as described in the aforementioned international PCT patent application would be extremely beneficial to employ. However, these alternative situations may not necessarily be associated with production and cannot consequently bear high investment costs as often experienced within petrochemical industries. For example, such alternative situations concern: hospitals in poorer parts of the World, police organisations, smaller courier firms, customs organisations, complex renewable energy facilities such as wind farms comprising many wind turbines, and flexible public transport networks. Often these alternative situations introduce requirements for enhanced flexibility which are not readily accommodated in the aforementioned software products for implementing the aforesaid control centre. In other words, although the aforementioned control centre is an enormously valuable tool for controlling multiple concurrent processes, its cost of implementation is insufficiently low to enable it to be employed in numerous other diverse applications.

Moreover, many situations potentially arise were an ad-hoc meeting is required, for example a discussion meeting organized at short notice, where participants to the meeting need to present documents and also point out details in documents, for example details in diagrams and captions. Whereas such interactive activities are easy to implement when people are spatially gathered together in a real meeting room, such sharing of information is more difficult when participants to the meeting are at mutually remote localities and coupled by electronic communication media.

SUMMARY OF THE INVENTION

The present invention seeks to provide an information display system which is susceptible to being implemented in an economical manner.

Moreover, the present invention seeks to provide an information display system which is more flexible than known information display systems. For example, the invention seeks to provide an approach to facilitating ad-hoc meetings wherein participants to the meeting are at mutually spatially remote locations and are desirous to share documents in a manner akin to what would occur at a real meeting where the participants are gathered together in a meeting room.

According to a first aspect of the present invention, there is provided an information display system as claimed in appended claim 1: there is provided an information display system including computing hardware coupled to a graphical screen interface, characterized in that the system includes one or more interface modules for receiving input data streams, the computing hardware is operable to execute one or more software products for generating a software environment presented in operation on the graphical screen interface, and the computing hardware is operable when executing the one or more software products to present a representation of one or more of the input data streams in one or more graphical windows within the software environment as provided on the graphical screen interface.

The invention is of advantage in that representation of the one or more data streams in the one or more windows renders the system more flexible and versatile, and the modules enable the system to be expanded and adapted as required, for example using standard proprietary off-the-shelf parts.

The invention also provides for process-defined meetings to be presented on the graphical screen interface, as well as providing for ad-hoc meetings to be presented where documents are spontaneously discussed and presented without needing to be defined a priori in any process.

Optionally, in the information display system, the one or more software products when executed on the computing hardware are operable to control one or more temporal processes, each process comprising one or more steps, and the one or more processes being presentable on the graphical screen interface by way of one or more graphical windows corresponding to one or more of the input data streams pertinent to one or more steps of the presented one or more processes. More optionally, in the information display system, the one or more graphical windows are defined a priori in association with their one or more steps.

Optionally, in the information display system, the one or more software products are operable when executed upon the computing hardware so that the one or more graphical windows are susceptible to being created in real time when their corresponding one or more steps are being presented on the graphical screen interface. More optionally, in the information display system, the one or more graphical windows created in real time are associated with their corresponding one or more input streams by defining one or more signatures present in the one or more input data streams.

Optionally, in the information display system, the computing hardware is implemented as at least one personal computer coupled to one or more graphical display screens, the at least one personal computer including a connection arrangement for receiving the one or more interface modules. More optionally, in the information display system, the at least one personal computer is coupled via at least one video bus to the one or more graphical display screens, and the one or more interface modules are operable to execute data processing locally therein and to provide corresponding graphic window data to the video bus. A personal computer (PC) is to be regarded as a computer of type, size and cost which renders it susceptible to being personally owned by individuals, and has a physical size corresponding to a small suitcase or smaller. Such personal computers are of size that enables them to be conveniently mounted when deployed onto a table-top or bookshelf. Contemporarily, such computers are typically of a cost less than Euro 3000 (2009 prices).

Optionally in the information display system, the one or more interface modules are operable to cope with processing at least one of:
(a) video data streams;
(b) audio data streams;
(c) sensor data streams;
(d) database data streams;
(e) external command data streams.

According to second aspect of the invention, there is provided a method as claimed in appended claim 9: there is provided a method of controlling one or more processes by employing an information display system including computing hardware coupled to a graphical screen interface, characterized in that
the method involves:
(a) including in the system one or more interface modules for receiving input data streams,
(b) executing in the computing hardware one or more software products for generating a software environment presented in operation on the graphical screen interface, and
(c) presenting when executing the one or more software products on the computing hardware a representation of one or more of the input data streams in one or more graphical windows within the software environment as provided on the graphical screen interface.

Optionally, the method includes:
controlling, when executing the one or more software products on the computing hardware, one or more temporal processes, each process comprising one or more steps, and the one or more processes being presentable on the graphical screen interface by way of one or more graphical windows corresponding to one or more of the input data streams pertinent to one or more steps of the presented one or more processes. More optionally, the method includes defining the one or more graphical windows a priori in association with their one or more steps.

More optionally, the method includes implementing the one or more software products to be operable when executed upon the computing hardware so that the one or more graphical windows are susceptible to being created in real time when their corresponding one or more steps are being presented on the graphical screen interface. More optionally, the method includes associating the one or more graphical windows created in real time with their corresponding one or more input streams by defining one or more signatures present in the one or more input data streams.

Optionally, the method is implemented by way of the computing hardware being implemented as at least one personal computer coupled to one or more graphical display screens, the at least one personal computer including a connection arrangement for receiving the one or more interface modules. More optionally, the method includes coupling the at least one personal computer via at least one video bus to the one or more graphical display screens, and the one or more interface modules are operable to execute data processing locally therein and to provide corresponding graphic window data to the video bus.

More optionally, when implementing the method, the one or more interface modules are operable to cope with processing at least one of:
(a) video data streams;
(b) audio data streams;
(c) sensor data streams;
(d) database data streams;
(e) external command data streams.

According to a third aspect of the invention, there is provided a software product recorded on a machine-readable data carrier, the software product being executable upon computing hardware for implementing a method pursuant to the second aspect of the invention.

According to a fourth aspect of the invention, there is provided a renewable energy facility controlled and managed using a system pursuant to the first aspect of the invention.

It will be appreciated that features of the invention are susceptible to being combined in any combination without departing from the scope of the invention.

DESCRIPTION OF THE DIAGRAMS

Embodiments of the present invention will now be described, by way of example only, with reference to the following diagrams wherein.

In the accompanying diagrams, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DESCRIPTION OF EMBODIMENTS OF THE INVENTION

Figure 1:
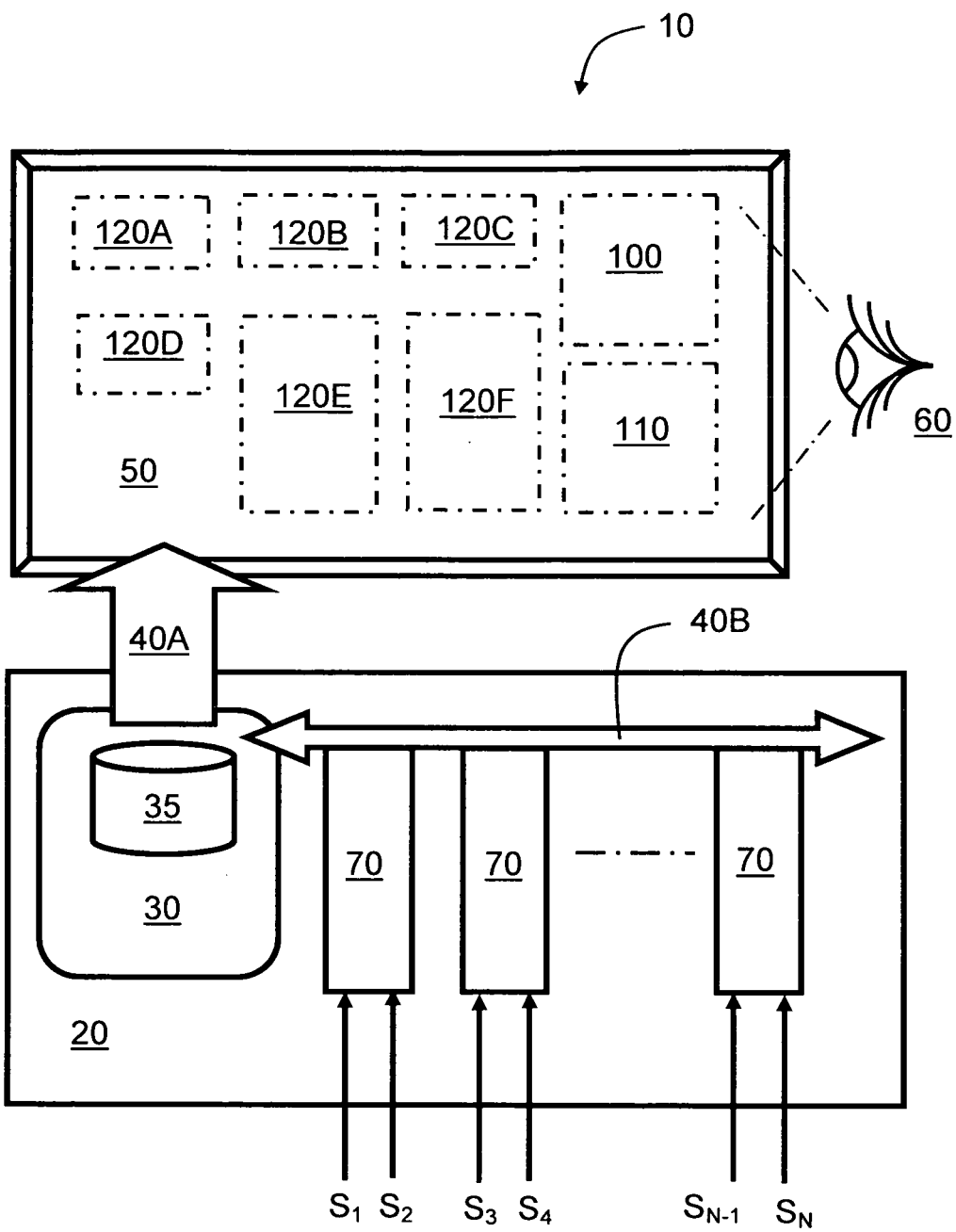
FIG. 1 is an illustration of an information display system pursuant to the present invention.

Referring to FIG. 1, an illustration of an information display system is indicated generally by 10. The information display system 10 includes computing hardware 20 coupled via a data bus arrangement denoted by 40A to a graphical screen interface 50. The computing hardware 20 is optionally conveniently implemented using one or more personal computers (PC), for example as a configuration including at least one of: one or more lap-top computers, one or more fixed-installation personal computers, one or more data servers.

The graphical screen interface 50 is optionally implemented using one or more wall-mounted monitors, for example at least one of: one or more flat-panel liquid crystal pixel display screens, a projection display.

A personal computer (PC) is to be regarded for the purpose of the present invention to be a computer of type, size and cost which enables it to be personally owned by individual persons, and has a physical size corresponding to a small suitcase or smaller. Such personal computers are of size that enables them to be conveniently mounted when deployed onto a table-top or bookshelf. Contemporarily, such computers are typically of a cost of less than Euro 2000 (2009 prices). An example of a proprietary computer suitable for implementing the present invention is a Dell Precision T7500 or similar.

Moreover, the computing hardware 20 includes one or more data processors 30 which are operable to execute one or more software products 35, for example one or more software products stored on one or more magnetic disc drives of the computing hardware 20, for creating a software environment as presented in operation on the graphical screen interface 50 for one or more users 60 to at least observe. The one or more software products 35 beneficially include one or more standard proprietary software products, for example a Linux or Microsoft proprietary software platform. Moreover, the one or more software products 35 when in execution are operable to accommodate input from the one or more users 60, for example management input commands for guiding implementation of one or more processes being supported by the computing hardware 20. As will be described later, steps of the processes invoke various windows 100, 110, 120A to 120F to be selectively activated and presented on the graphical screen interface 50 in response to the one or more users 60 requesting a status report on the processes and/or in response to one or more events occurring in facility being controlled by the processes. An event can, for example, be one or more sensor signals exceeding one or more threshold values defined for the processes, for example maximum pressure within a configuration of oil wells, one or more patients going into coma or having cardiac arrest, one or more courier delivery vans being hijacked by bandits, one or more ships being impounded by pirates, one or more road accidents occurring and so forth.

The computing hardware 20 further includes a back-plane denoted by 40B for receiving one or more modules 70. When the computing hardware 20 is implemented as a personal computer of proprietary type Dell Precision T7500, the one or more modules 70 are beneficially implemented using proprietary plug-in card modules of proprietary type Datapath RGB PRO2 or similar. Beneficially, each module 70 is implemented as a proprietary interface card including one or more on-board data processors for providing local data processing and an electrical coupling connector for connecting onto the back-plane 40B. Moreover, each module 70 includes one or more inputs for receiving one or more input data streams S, for example pursuant to USB and/or DVI contemporary standards although other types of data streams and signals can be optionally accommodated. Beneficially, there are included a plurality of the modules 70 for receiving N input data streams denoted by $S_1$ to $S_N$. The input data streams S optionally include at least one of:
(a) video data streams;
(b) audio data streams;
(c) sensor data streams;
(d) database data streams; and
(e) external command data streams.

For example, the input data streams S can be provided via the Internet, via a telephony system, via satellite communication, and/or via one or more custom data communication links. One or more of the data streams S are beneficially, for example, provided via one or more wireless communication routes for allowing for flexible communication infrastructure; for example, at least one of the data streams can be provided by a lap-top personal computer of a technical expert out within a technical production facility being controlled by the information display system 10.

Figure 2:
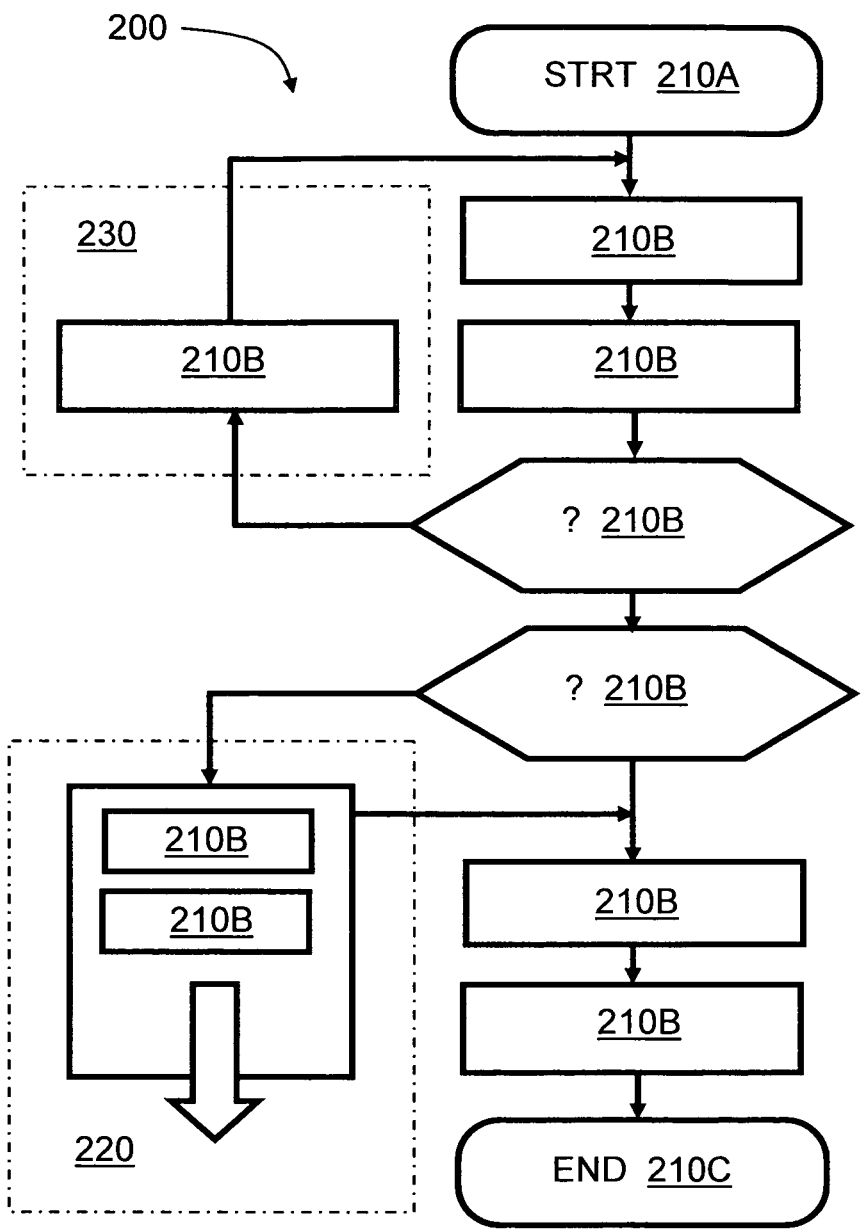
FIG. 2 is an illustration of a process supported by the display system illustrated in FIG. 1.

In the software environment provided by the one or more software products 35, one or more processes can be predefined. For example, a representation of such a process is indicated generally by 200 in FIG. 2. This representation should not be confused with a normal flow chart because the process 200 can cause concurrently occurring activities in a manner unlike a normal flow chart. The process 200 includes one or more steps, for example a start step 210A, one or more intermediate steps 210B and an end step 210C. Moreover, the process 200 optionally has side branches invoked when certain conditions arise within a facility being controlled by the process 200. Moreover, the process 200 optionally includes loops 230 when the process 200 requires one or more of its steps 210B to be repeated. Additionally, the process 200 at one or more of its steps 210B is optionally operable to invoke other processes 220, for example in a hierarchical manner. Invoking other processes is optionally dependent upon certain conditions arising within the facility. Many such processes 200 are potentially being concurrently supported in the software environment, and the processes 200 can invoke one another processes depending upon a state of the facility being controlled by the processes 200.

Each step 210A, 210B, 210C of the process 200 has a corresponding set of windows 100, 110, 120A to 120F that are generated on the graphical screen interface 50. The window 100 is for example a real-time visual image of the one or more users 60, the window 110 is a real-time image of external parties associated with the process 200, and one or more of the windows 120A to 120F correspond to graphs, diagrams, data sheets, regulation documents, real-time images, and functions of the facility which can be controlled by the one or more users 60 via the system 10. It will be appreciated that the windows 100, 110, 120A to 120F can appear in a different spatial arrangement than ad depicted in FIG. 1. Moreover, the one or more software products 35 beneficially allow the one or more users 60 to move the one or more windows spatially around the graphical screen interface 50 in a manner which is most informative and useful to the one or more users 60. Optionally, there are more windows 100, 110, 120A to 120F, alternatively fewer windows 100, 110, 120A to 120F, presented on the graphical screen interface 50 than illustrated in FIG. 1. FIG. 1 is merely an illustrative example.

Figure 3:
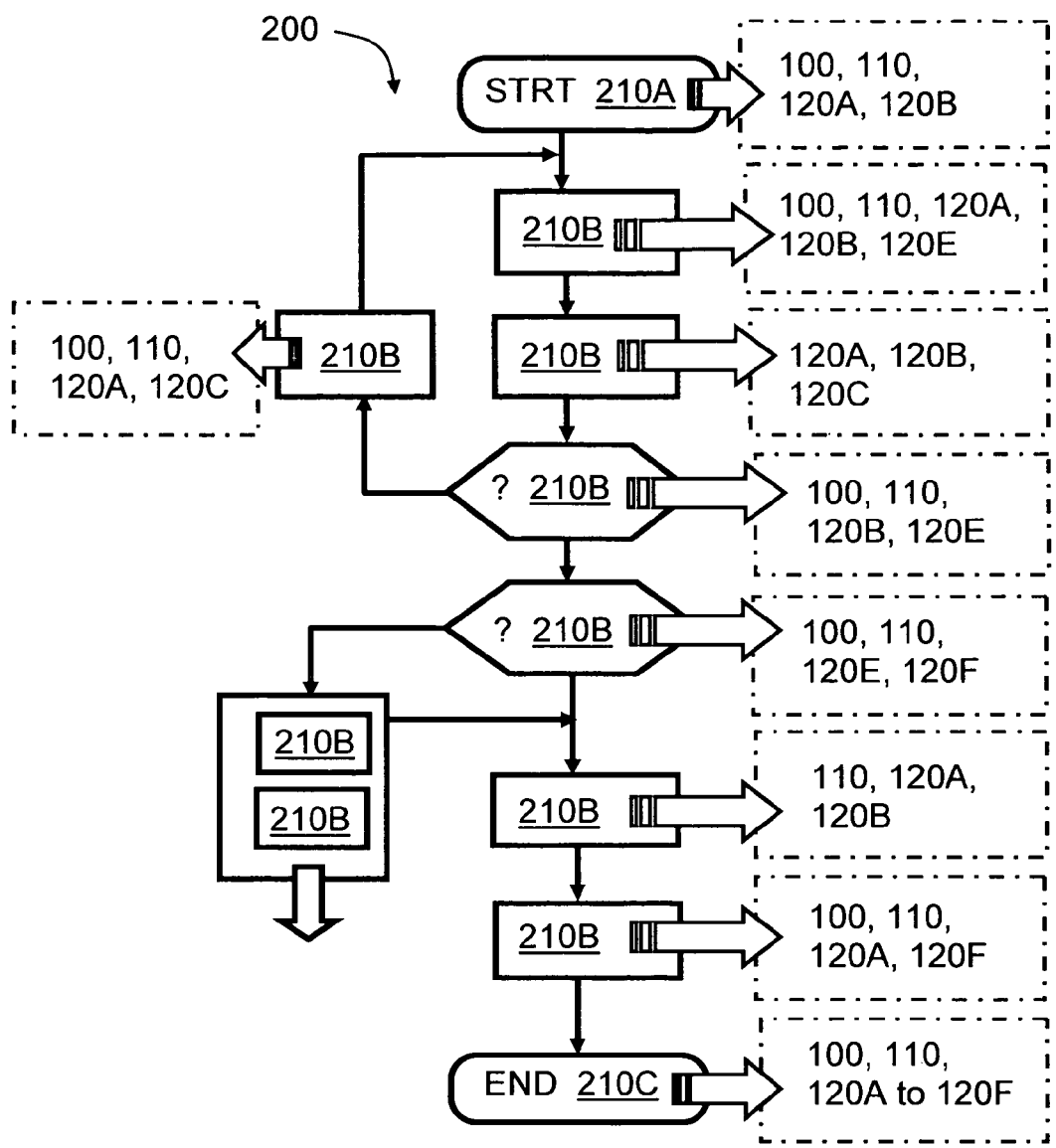
FIG. 3 is an illustration of the process of FIG. 2 including designation of windows to be presented by the system in association with steps of the process.

Beneficially, for a given step 210A, 210B, 210C of the process 200, a configuration of one or more of the windows 100, 110, 120A to 120F is defined beforehand, namely a priori, when designing the process 200 and entering its parameters via the software environment, or independently thereto via one or more auxiliary support software products. Such allocation of the windows is illustrated in FIG. 3 as an example. Each window represents a data stream S or a document from a database. However, situations potentially arise where a greater degree of flexibility is required to a process which has been defined beforehand, namely a priori. The one or more software products 35 allow the one or more users 60 to introduce additional windows into the graphical screen interface 50. The additional windows are associated with an appropriate data input stream by the one or more users 60 defining one or more signatures or characteristics present in the input streams which are to be presented in the additional windows, for example by at least one of:
(a) data stream code reference;
(b) data stream properties, for example its format such as video stream, sensor signal sample, component list, personnel lists and so forth;
(c) date of generation and/or updating of the data stream;
(d) a party, author or organisation which has created a document or dataset present in the data stream.

For example, when the information display system 10 is employed by a group of medical surgeons corresponding to the one or more users 60, wherein the system 10 is deployed in diverse hospitals in different parts of a country, the windows 100, 110, 120A to 120F are able to provide a form of video conferencing facility wherein video images of the surgeons are provided in respective windows and voice signals corresponding to the surgeons are made available by the system 10 to all the surgeons. From time to time during a conference discussion using the system 10, a surgeon can invoke a document, a medical report, an X-ray picture, an MRI scan and such like as an additional window for presenting on the graphical screen interface 50. In such a scenario, the process 200 can be a course of treatment for a patient to heal the patient of one or more illnesses. The system 10 thereby enables the hospitals to establish a standard uniform quality of service and adopt best practice in the treatment of their patients.

On account of the informational display system 10 being susceptible to being implemented using standard computing hardware, pixel displays and proprietary interfacing cards for the one or more modules 70, the system 10 is susceptible to being constructed quickly at relatively low cost. Such rapidity of deployment and low cost renders the system 10 suitable to support a wide spectrum of activities including, but not limited to, the following:
(a) a configuration of oil wells;
(b) a distribution organisation, for example a courier service, a relief aid service;
(c) a taxation service, for example as in local government;
(d) a healthcare providing service, for example a configuration of hospitals such as a hospital trust;
(e) a police service, a law enforcement service;
(f) a renewable energy generation facility;
(g) an electricity distribution network, a gas distribution network, a water distribution network;
(h) an air traffic control system;
(i) a security system for residential or industrial premises, a fire detection system, a flood detection system.

Figure 4:
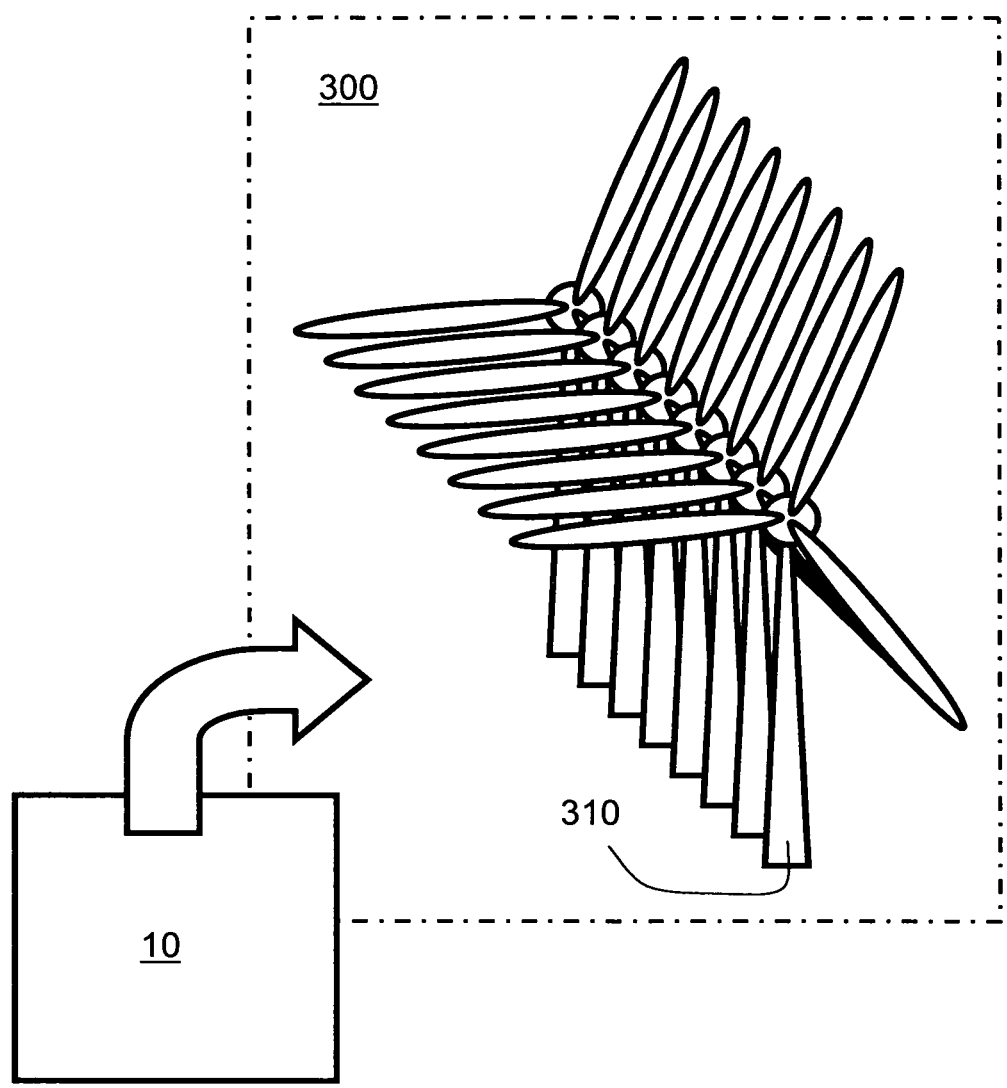
FIG. 4 is an illustration of a renewable energy facility including a plurality of apparatus, the system of FIG. 1 being useable for maintaining and operating the facility.

A highly relevant application for the present invention is controlling and managing complex arrays 300 of renewable energy devices, for example offshore window turbines 310 as illustrated in FIG. 4. Presently, the World consumes 80 million barrels of oil per day. Each barrel of oil has an energy content corresponding to approximately 1.7 MJh. In order to produce similar amounts of energy from offshore wind turbines 310, there arises a requirement for extensive off-shore arrays 300 of at least tens of thousands of wind turbines 310 having a wingspan of 200-metre or greater. A 200-meter diameter wingspan wind turbine 310 is capable of generating an electrical output in a range of 10 MW to 100 MW. Installing and maintaining tens of thousands of wind turbines 310 offshore is an enormous logistics task requiring great organisational skills and technical understanding. When technical personnel are working offshore, it is essential that their time resources are used efficiently in coordination with repair and maintenance schedules for the numerous wind turbines 310. The system 10 is capable of providing great benefit in such a situation to low cost and rapid deployment. Similar considerations pertain to arrays of solar collectors in dessert environments for converting solar energy into electrical energy; such collectors need to be cleaned, repaired and replaced according to maintenance schedules for ensuring that the arrays of solar collectors are performing optimally. The system 10 is capable of coordinating and managing such maintenance schedules. Yet additionally, the system 10 is also susceptible to being used for maintaining and operating complex configurations of mini- and micro-hydroelectric schemes, for example as being planned for deployment in Norway to enhance its total hydroelectric electricity generating capacity.

In the foregoing, use of the system 10 in association with the process 200 is described. The system 10 is also beneficially used for arranging ad-hoc meetings which are not necessarily defined to occur in any given process 200. For example, personnel at mutually spatially different locations may be desirous to hold an ad-hoc meeting where various documents are to be discussed. The system 10 is operable to accommodate such ad-hoc meetings without a process 200 needing to be invoked and allow personnel spontaneously to introduce new documents to the meeting, for example by spontaneously establishing new data streams and identifying document files to form such data streams for causing graphical windows to be generated on the graphical screen interface 50 in which the new documents are presented.

Modifications to embodiments of the invention described in the foregoing are possible without departing from the scope of the invention as defined by the accompanying claims.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural.

Numerals included within parentheses in the accompanying claims are intended to assist understanding of the claims and should not be construed in any way to limit subject matter claimed by these claims.

The invention claimed is:
1. An information display system, comprising:
at least one graphical screen interface;
a computer device including one or more interface modules for receiving input data streams, said computer device including memory for storing one or more software products, and at least one processor operable to execute the one or more software products for generating and displaying a software environment on the at least one graphical screen interface,
said one or more software products when executed on said computer device being operable to control one or more temporal processes, each process comprising one or more steps which are associated with one or more of the input data streams;
wherein during execution of each of the one or more steps said computer device generates and displays, in real time, one or more graphical windows that include content from the one or more input data streams associated with each step of the software environment being displayed on the at least one graphical screen interface; and
wherein the content displayed on the one or more graphical windows on the at least one graphical interface selectively changes in a predetermined sequence as each of the corresponding one or more steps progresses to a next step during the execution of the one or more software products by the computer device, wherein each step of the process has two or more windows, the two or more windows selected from a set of windows, the set of windows comprising a visual image of one or more users, a real-time image of external parties associated with the process, and at least one data window.

2. The information display system as claimed in claim 1, wherein said one or more graphical windows are defined a priori in association with their one or more steps.

3. The information display system as claimed in claim 1, wherein said one or more software products are operable when executed upon said computing hardware so that said one or more graphical windows are susceptible to being created in real time when their corresponding one or more steps are being presented on said graphical screen interface.

4. The information display system as claimed in claim 3, wherein said one or more graphical windows created in real time are associated with their corresponding one or more input streams by defining one or more signatures present in said one or more input data streams.

5. The renewable energy facility controlled and managed using a system as claimed in claim 1.

6. The information display system of claim 1, wherein the computer device is communicably coupled to one or more interface modules having one or more inputs for receiving the one or more input data streams.

7. The information display system of claim 1, wherein execution of the one or more steps is invoked by one or more users of the information display system.

8. The information display system as claimed in claim 1, wherein the two or more windows is three or more windows selected from the set of windows.

9. The information display system as claimed in claim 8, wherein a first window includes a visual image of a user, a second window includes a real-time image of an external party, and a third window includes the at least one data window.

10. The information display system as claimed in claim 1, wherein the at least one data window comprises at least one of graphs, diagrams, data sheets, regulation documents, real-time images, and functions of the facility.

11. A method of controlling one or more processes by employing an information display system including at least one graphical screen interface communicably coupled to computing hardware having memory for storing one or more software products and at least one processor for executing the one or more software products stored in memory said method comprising:

(a) receiving input data streams from one or more interface modules communicably coupled to the computing hardware;

(b) executing, in said computing hardware, the one or more software products for generating and displaying a software environment on the at least one graphical screen interface;

(c) displaying in real time, when executing one or more steps of said one or more software products on said computing hardware, a representation of one or more of the input data streams in one or more graphical windows within said software environment as provided on said at least one graphical screen interface; and (d) changing the representation in a predetermined sequence of one or more of said input data streams, in real time, to display different content from the input data streams in the one or more graphical windows as each of the one or more steps progresses to a next step during execution of the one or more software products, wherein each step of the process has two or more windows, the two or more windows selected from a set of windows, the set of windows comprising a visual image of one or more users, a real-time image of external parties associated with the process, and at least one data window.

12. The method as claimed in claim 11, further including the step of defining said one or more graphical windows a priori in association with their one or more steps.

13. The method as claimed in claim 11, further including the step of implementing said one or more software products to be operable when executed upon said computing hardware so that said one or more graphical windows are susceptible to being created in real time when their corresponding one or more steps are being presented on said graphical screen interface.

14. The method as claimed in claim 13, further including the step of associating said one or more graphical windows created in real time with their corresponding one or more input streams by defining one or more signatures present in said one or more input data streams.

15. The software product recorded on a non-transitory machine-readable data carrier, said software product being executable upon computing hardware for implementing a method as claimed in claim 11.

16. The method as claimed in claim 11, wherein the two or more windows is three or more windows selected from the set of windows.

17. The method as claimed in claim 16, wherein a first window includes a visual image of a user, a second window includes a real-time image of an external party, and a third window includes the at least one data window.

18. The method as claimed in claim 11, wherein the at least one data window includes at least one of graphs, diagrams, data sheets, regulation documents, real-time images, and functions of the facility.

* * * * *